J. RACLOT & C. ENDERLIN.
FLYING MACHINE.
APPLICATION FILED MAY 2, 1910.
1,037,050.
Patented Aug. 27, 1912.
5 SHEETS—SHEET 2.
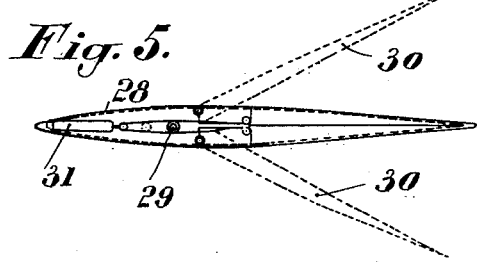
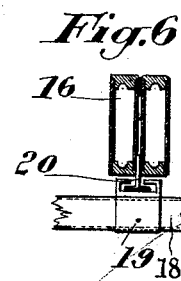
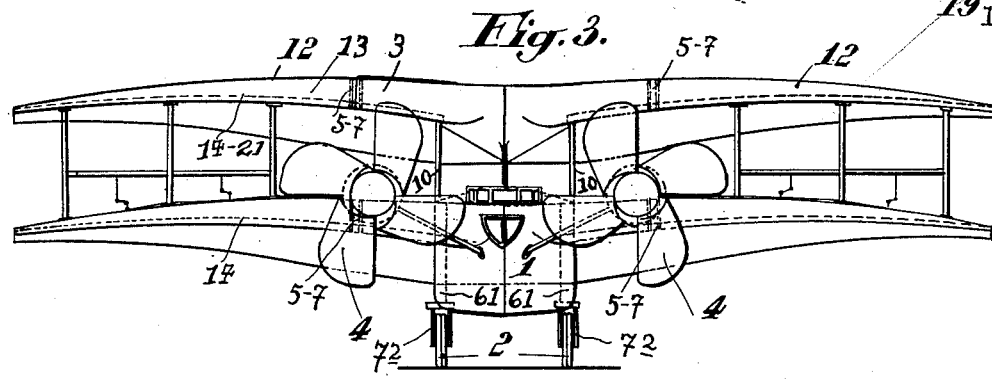
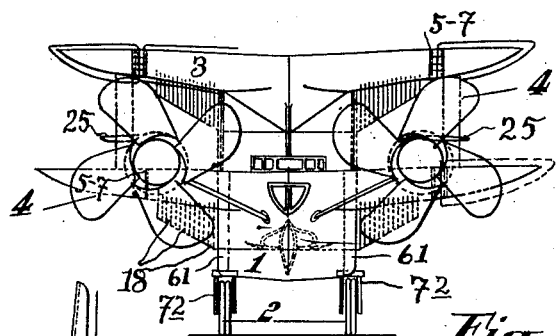
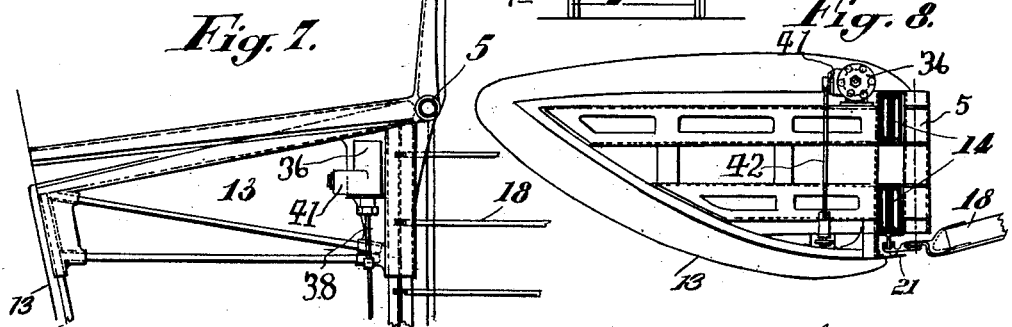
Witnesses:
M. E. Gray
F. M. Meyer
Inventors:
Jules Raclot, Camille Enderlin
Attorney

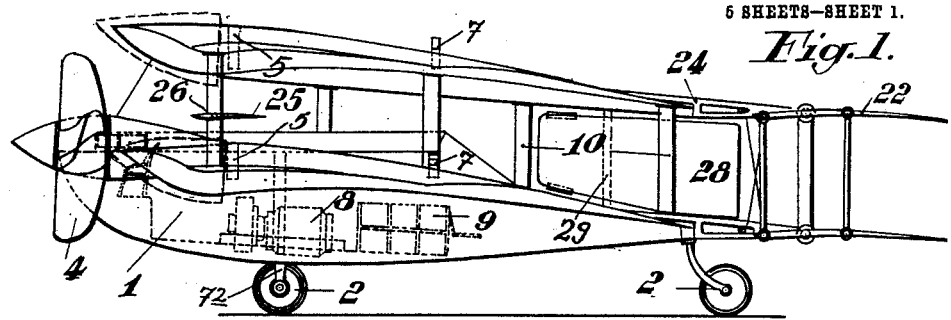
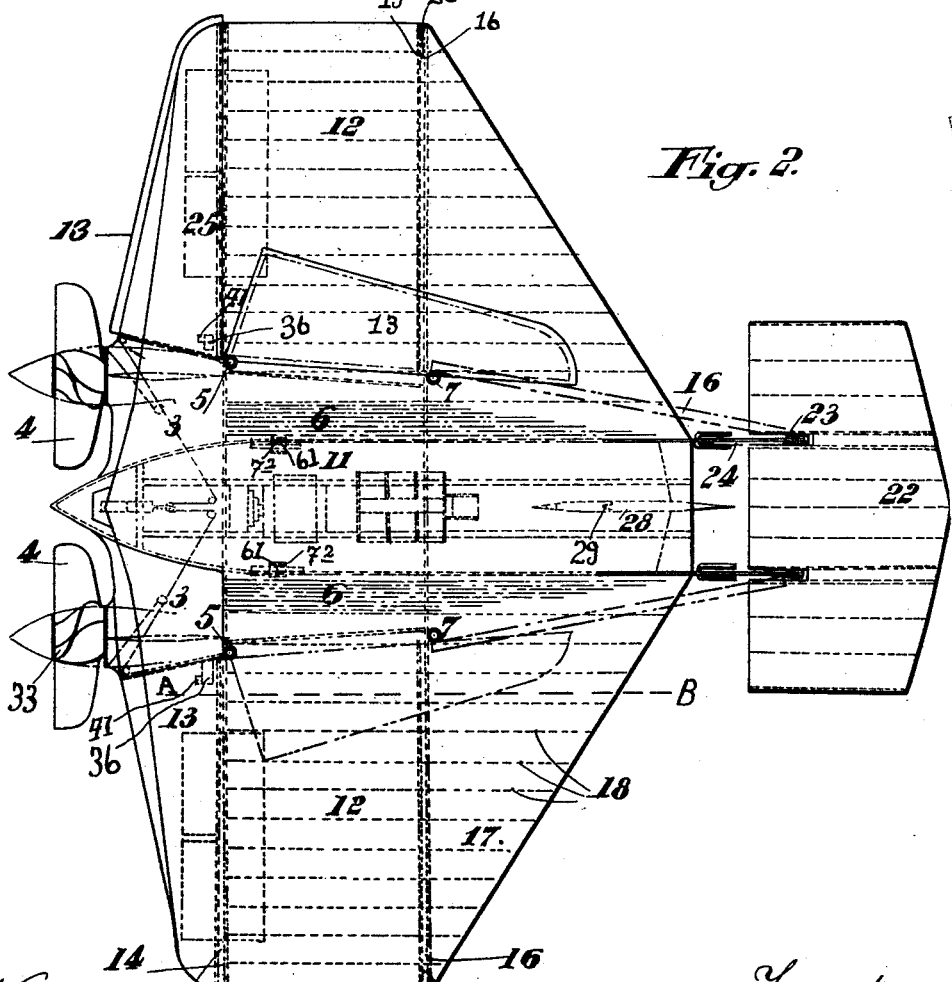

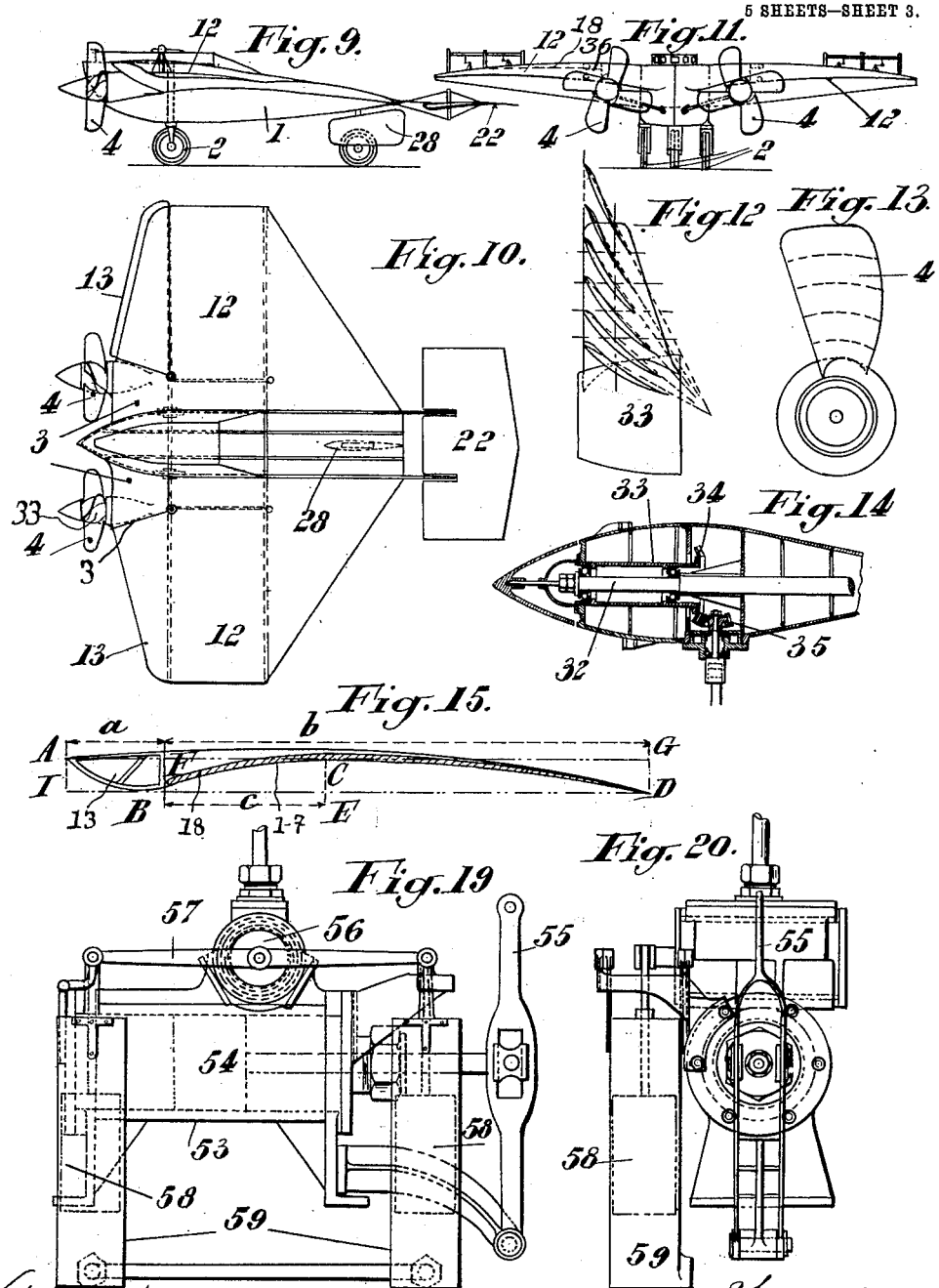

J. RACLOT & C. ENDERLIN.
FLYING MACHINE.
APPLICATION FILED MAY 2, 1910.
1,037,050.
Patented Aug. 27, 1912.
5 SHEETS—SHEET 4.
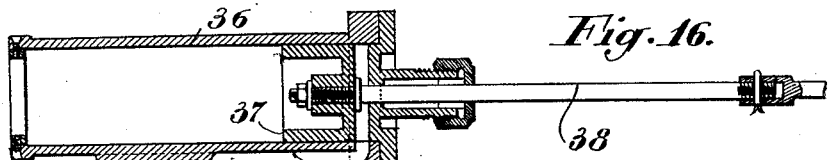
Fig. 16.
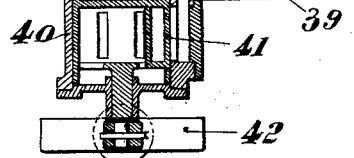
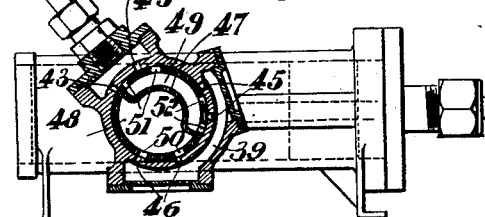
Fig. 17.
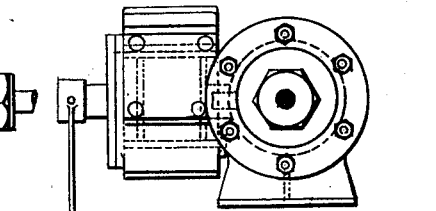
Fig. 18.
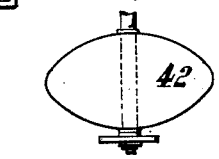
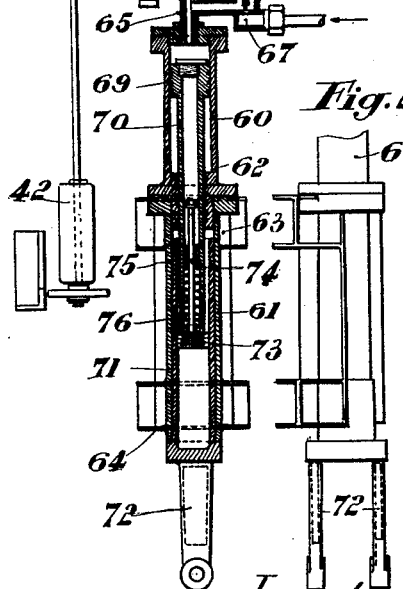
Fig. 22.
Fig. 23.
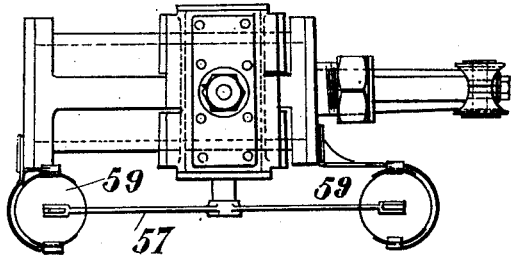
Fig. 21.
Witnesses:
M. E. Gray
F. M. Meyer
Inventors:
Jules Raclot, Camille Enderlin
By _____ Attorney.

J. RACLOT & C. ENDERLIN.
FLYING MACHINE.
APPLICATION FILED MAY 2, 1910.
1,037,050.
Patented Aug. 27, 1912.
5 SHEETS—SHEET 5.
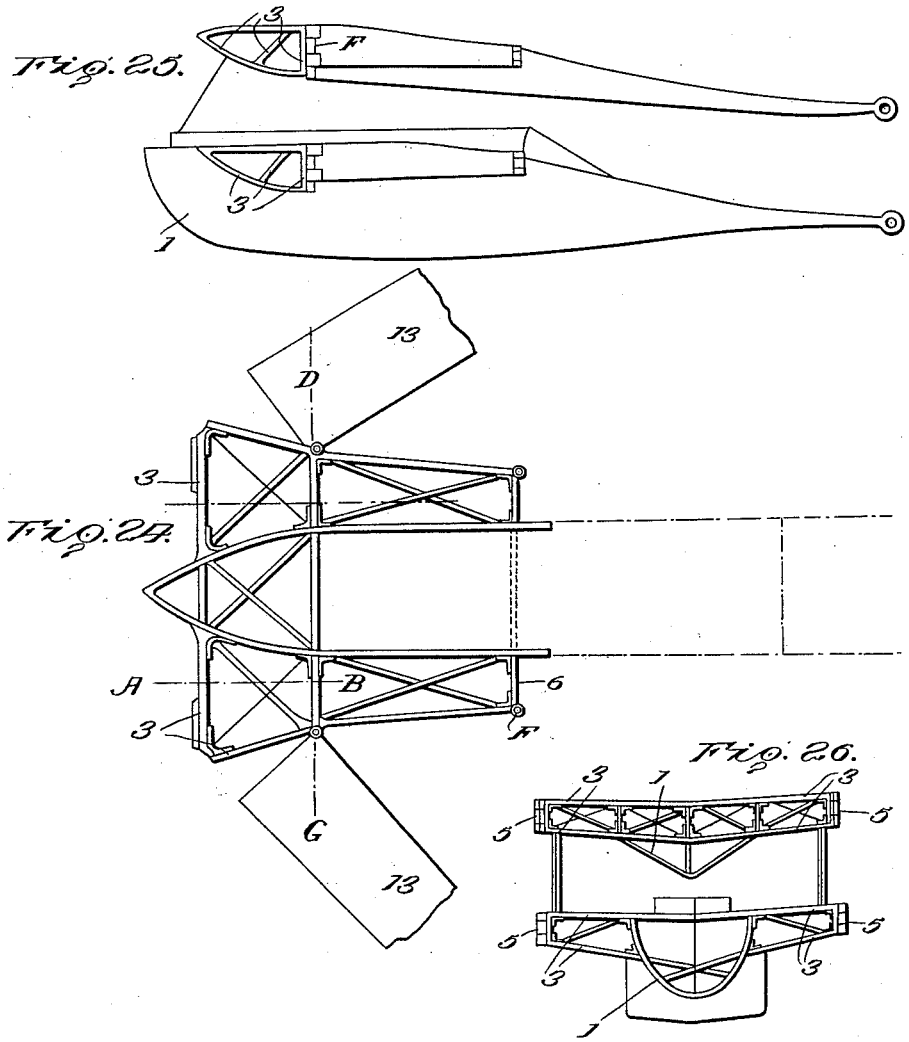
Witnesses
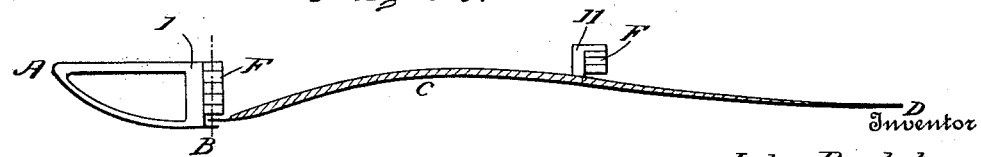
Inventor
Jules Raclot,
C. Enderlin.
By
Attorney

UNITED STATES PATENT OFFICE.

JULES RACLOT AND CAMILLE ENDERLIN, OF ST.-MAUR-DES-FOSSÉS, FRANCE.

FLYING-MACHINE.

1,037,050.  Specification of Letters Patent.  Patented Aug. 27, 1912.

Application filed May 2, 1910. Serial No. 558,753.

*To all whom it may concern:*

Be it known that we, JULES RACLOT and CAMILLE ENDERLIN, both citizens of the Republic of France, and residents of St.-Maur-des-Fossés, Seine, France, have invented certain new and useful Improvements in Flying-Machines, of which the following is a specification.

This invention relates to a flying machine adapted to be constructed with one or more superposed supporting surfaces and characterized by the following main points: 1°.—The stabilizing, directing and supporting surfaces have a longitudinal profile showing a triple curvature and formed by three arcs of parabolæ. 2°.—These supporting surfaces are adapted to be folded laterally for storing purposes without it being necessary to take the apparatus into pieces. 3°.—The car forms a boat adapted to float on water and to support the whole apparatus. 4°.—The lateral balance is automatically obtained by means of stabilizing surfaces which are actuated by a servomotor which in turn is operated by a pendulum. 5°.—The longitudinal equilibrium is automatically obtained by means of the horizontal rudder which serves as a stabilizing surface for the pitching motion and which is actuated by a double acting servo-motor based upon the principle of the communicating vessels. 6°.—The screw propellers are mounted in such a manner that the air is forced under the supporting surfaces and they carry speed reducing gears on their hubs. 7°.—The vertical rudder comprises two wings which may be opened like screens around a vertical shaft so as to produce a great resistance to the forward propulsion; this arrangement combined with the forcing of the air under the supporting surfaces by the screw propellers, allows the apparatus to rise nearly vertically. 8°.—The front carrying wheels of the apparatus are mounted on hydro-pneumatic shock deadening devices intended to avoid any transmission of shocks to the remainder of the apparatus at the moment of the landing.

The accompanying drawings show by way of example several forms of embodiment of the flying machine which forms the subject matter of this invention and in these drawings: Figure 1 is a side elevation view showing the whole apparatus unfolded and ready for starting. Fig. 2 is a top plan view of same. Fig. 3 shows a front elevation of same. Fig. 4 is a front elevation view of the apparatus the sails of which are folded back for putting up purposes. Fig. 5 is a top plan detail view of the vertical rudder. Fig. 6 is a longitudinal detailed section showing the manner of mounting the sails. Fig. 7 is a detail top plan view showing this mounting as well as the structure of the hinges and their connection with the framework of the stem of the wings. Fig. 8 is a corresponding vertical section. Fig. 9 is a side elevation view showing the *ensemble* of a flying machine constructed in the form of a monoplane according to the present invention. Fig. 10 is a top plan view of same. Fig. 11 shows a front elevation view. Fig. 12 is a side elevation view of the screw propeller, this figure showing also the tracing of the propeller. Fig. 13 is a front elevation view of same. Fig. 14 is a horizontal view section showing the mounting of the transmission gear of the screw propeller. Fig. 15 is a diagram showing the triple curvature of the carrying and other planes. Fig. 16 is a horizontal section of the pendulum servo-motor for the stabilizing planes. Fig. 17 is a vertical section partly in section of same. Fig. 18 is an end elevation view. Fig. 19 is a side elevation view of the servo-motor based upon the principle of the communicating vessels and intended to be applied to the horizontal rudder so as to serve as a stabilizing device for the pitching motion. Fig. 20 is a front elevation view of the same. Fig. 21 is a top plan view of the same. Fig. 22 is a vertical section through the center line of a hydro-pneumatic shock deadening device intended to be applied to the front carrying wheels of the apparatus. Fig. 23 is an elevation view of same.

As shown by the drawings the apparatus comprises a car or body 1 having the shape of a boat entirely covered by canvas and adapted to float on the water supporting the entire apparatus. This car carries four wheels 2 provided with pneumatic tires. The front wheels are mounted in forks which are connected with landing shock deadening devices described below and the rear wheels are swiveled to the frame. The car is provided at its front with two lateral arms 3 carrying the screws 4 and provided with vertical hinges 5 made of light metal and on its sides with still two other arms 6 carrying vertical hinges 7. These four arms 3 and 6 are rigidly connected with the framework of the car with which they are integral. In the car 1 is supported the motor 8, the fuel tanks, the servo-motors and the seats 9 for passengers.

The apparatus has been shown in detail in the form of a biplane comprising two main superposed carrying planes which are connected together by means of posts 10. The upper plane comprises a fixed part 11 which is positioned above the car and two lateral wings 12 which may be folded back against the sides of the car so as to render the storing of the apparatus easier. The lower plane comprises two similar lateral wings arranged on both sides of the car and also adapted to be folded back. Each of these lateral wings comprises a bow 13 shown partially in top plan view in Fig. 7 and in end elevation view by Fig. 8. This bow 13 comprises beams 14 and a reinforced structure in the shape of a rounded wedge. Each bow 13 is secured by means of the hinges 5 to the arms 3 of the car. The front edge 15 has for its object to divide the air. The four bows 13 are entirely covered at their lower part with a cover made of very thin planks and covered with fabric so as to prevent any deformation or any formation of a pocket. The curvature of the front arc of these bows is determined by their general diagram giving the longitudinal section of each wing as will be seen later on. It corresponds to A—B, Fig. 15. Besides the bow 13, each wing comprises planes which are supported by arms 16 (Figs. 2 and 6), formed by two juxtaposed beams which are hingedly connected with the car by means of hinges 7. Each plane is formed by a sheet of canvas 17 secured to longitudinal parallel purlins 18 which are suspended from the corresponding arm 16 by means of slotted members 19 (Fig. 6) which engage a light metal guide 20 having the shape of a T iron and provided on the arms 16. The front ends of the purlins 18 are guided by claws 21 (Fig. 8) on guides provided on the lower surface of the beams 14 forming a part of the bows 13. The purlins 18 are consequently adapted to slide parallelly to themselves so as to apply themselves against the car where they are supported by the arms 3 and 6. The bows 13 and the beams 16 are then adapted to pivot respectively around the hinges 5 and 7 so as to occupy when folded the position shown by the dot and dash lines in Fig. 2 and in front elevation in Fig. 4. A system of ropes and pulleys allows of the wings being spread out or folded back according to whether it is desired to make the apparatus ready for starting or to store it away. When the sails are unfolded the purlins 18 give them a great rigidity. The longitudinal profile of the planes which corresponds to that of the purlins 18 has been shown by part B C D of Fig. 15. As readily seen from the latter figure, the *ensemble* of each supporting plane comprising the bow 13 and the corresponding sails carried by the purlins 18 have a longitudinal profile with three different curvatures which curve is also employed for the auxiliary stabilizing planes and for the horizontal rudder or stabilizing device described later on. This profile is formed by three parabolic arcs. A designates the front edge, A B is the first parabolic arc connected with the second arc B C by a connecting curve. C D is the third arc. The two last named arcs of parabolæ have their summit at C and their center line is along C E. The points B, C and D are determined in such a manner that the distance A F=$a$ be the fifth part of F G and that F C=$c$ be the third part of F G=$b$. The arrow C E is equal to A I and to 8/100 of F G.

Besides the supporting planes the apparatus comprises a horizontal rudder 22. The latter is formed by a sail provided with purlins which at the same time give them a longitudinal curvature similar to that of the wings. This rudder 22 is adapted to vertically oscillate on hinges 23, being supported on longitudinal beams 24 made integral with the car. In order to reduce the strain which is necessary for actuating this rudder and in order to be able to employ to this end automatic apparatus having only a small power and a small weight, the said rudder is extended toward the front beyond its axis of oscillation so that the pressures received by the front and rear parts of the rudder are nearly balanced, the pressure exerted on the rear part being left greater.

At the front of the apparatus and between the two upper and lower carrying planes and on both sides of the car 1, the auxiliary stabilizing planes 25 are mounted which are adapted to oscillate vertically around a horizontal shaft 26 (Fig. 1). These stabilizing planes are relatively balanced in the same manner as the horizontal rudder 22 that is to say that their axis of oscillation is behind their front edge or cutting edge.

The vertical rudder 28 is positioned behind the car, and in front of the horizontal rudder 22. As clearly shown by Fig. 1, this vertical rudder which is adapted to oscillate around the vertical shaft 29 is provided with two vertical hinges around which two screens 30 are adapted to oscillate these screens being shown in an opened condition by dotted lines and being normally closed by springs 31 acting on pulleys. Cables (not shown) which are directly actuated by the pilot allow of the rear part of the rudder to be unfolded so as to oppose a great resistance to the propulsion of the apparatus.

The shaft of oscillation 29 of the entire rudder is arranged in such a manner that the latter be relatively balanced, this detail requiring no further description herein, as it forms the subject matter of a separate application filed May 18, 1911, Ser. No. 628,119. The propelling screws 4 are, as above stated, mounted on the two front arms of the car. The shafts 32 on which these screws rotate (Figs. 12–14) are stationary and tubular and the hubs 33 of the screws rotate freely on said shafts under the action of a large beveled wheel 34 meshing with a small beveled gear wheel 35 rotating at the same speed as the motor. The small pinion 35 is mounted into a removable plug serving as a bearing and allowing of an easy and rapid taking apart.

According to this invention auxiliary stabilizing planes 25 for the rolling motion are automatically actuated each by a pendulum servo-motor. Each of these servo-motors comprises as shown by Figs. 16 to 18 a cylinder 36 made of light metal in which moves a piston 37 which is brought back by springs acting directly on the planes in the position shown, Figs. 2 and 3, and the rod 38 of which is connected by means of levers, a rod 37' and intermediate angle levers 38' with the corresponding stabilizing plane 25. Only one of the ends of cylinder 36 is open, the other being connected by a passage 39 with a distributing cock or rotary valve comprising a casing 40 and an oscillating plug 41 connected with a pendulum 42. The body 40 has two openings or ports 43 (Fig. 17) which are connected at 44 with a compressed air reservoir receiving air from the motor of the flying machine and two pairs of openings or windows 45, 46 which are connected with the channel 39 leading to the cylinder. The plug 41 is divided by a partition wall 47 into two chambers 48 and 49, the chamber 48 being connected with the atmosphere as at 48'. The wall of the sleeve has a pair of ports or openings 50 in the chamber 48 and two pairs of openings 51, 52 in the chamber 49. Supposing that the cylinder 36 be arranged in the transverse direction of the aeroplane and that when the latter is horizontal in the transverse direction, the cock 41 occupies the position shown it will be noted that the cylinder is in communication with the atmosphere through channel 39, openings 46, openings 50, chamber 48, chamber 46' in the casing beyond the plug, and opening 48'; now if the flying machine is inclined laterally so as to lower for instance the right end of the cylinder (Figs. 16 and 17) the pendulum 42 which has a tendency to remain vertical causes the plug 41 to rotate in the body 40, it results therefrom that the openings 46 of the cock body are closed so that the cylinder does no longer communicate with the atmosphere through the channel 39 and the chamber 48. When the inclination becomes stronger, the openings 51 and 52 of the body register with the openings 43 and 45 respectively of the body so that compressed air is admitted to the cylinder 36 and is adapted to act upon the piston 37 which thereafter exerts a traction effort on the rod 38, thus actuating the corresponding stabilizing surface in such a manner that the aeroplane and consequently the cylinder 36 be brought back to the horizontal position. The reverse function then takes place and the compressed air is adapted to escape from the cylinder, the piston 37 being thereafter brought back by the springs (not shown) into its normal position. The dimension of the openings has been calculated in such a manner that the servo-motor enters into action as soon as the aeroplane has reached a predetermined inclination such as for instance 5°. Owing to the fact that the pressures applied to the planes are balanced the servo-motors which actuate the latter may be small and light.

The stabilizing servo-motor for longitudinal stability (Figs. 19 to 21) works in a similar manner as the servo-motor just described for the lateral stability, but it does not comprise a pendulum system but utilizes the force incident to spaced communicating columns of liquid in maintaining the same level, and comprises a cylinder 53 which is arranged in the longitudinal direction of the aeroplane and contains a double acting piston 54 acting on a lever 55 connected by means of cables with the horizontal rudder 22. The compressed air is conveyed to each face of this piston 54 by a double cock 56 constructed similarly to the cock 41 described above, one of the ends of this cock conveying the air to one of the faces of the piston and the other end to the other face. This cock 56 is actuated automatically according to the longitudinal inclination which the apparatus may assume and consequently the cylinder 53, by a lever 57 actuated in turn by floats 58 engaged in the communicating vessels 59 which contain water. As soon as the apparatus lowers its front end or raises it, the level of the water is lowered in one of the receptacles 59 and rises as much in the other one. The floats follow the same motion and act as a couple on the lever 57 and on the cock which conveys the compressed air on the face of the piston which has to act on the horizontal rudder 22 so as to bring the apparatus back into its horizontal position.

The landing shock deadeners intended to be applied to the front carrying wheels comprise each (Figs. 22 and 23) two cylinders 60, 61 made of light metal, superposed, connected by flanges and provided laterally with small holes 62 and 63 respectively. The lower cylinder is provided with longitudinal ribs so as to increase its resistance to flexure and with lugs 64 intended to allow the same to be fixed to the car. The upper cylinder 60 is closed at the top by a cover on which a box 65 provided with two valves 66, 67 is screwed. The valve 66 which is connected with a delivery pipe 68, is loaded with a spring adapted to exert a relatively high pressure (20 to 30 kilograms per square centimeter) and has a very small cross section. The valve 67 connects normally the box 65 with a reservoir containing an incongealable liquid subjected to a pressure of some kilograms per square centimeter. The fluid under pressure may be conducted to the said box by a duct leading from the reservoir provided for the stabilizing apparatus. The upper cylinder 60 contains a reciprocating piston 69 having a hollow stem 70 while the lower cylinder contains a hollow reciprocating piston 71 connected with the fork 72 which rests upon one of the front carrying wheels of the apparatus. The piston 71 is closed in its middle part by a screw threaded plug 73 which through a rod 74 extends inside the stem 70 of piston 69 to a screw threaded ring 75. The rod 74 carries a nut at its upper end and between the screw threaded plug 73 and the ring 75 is a coiled spring 76 which has a tendency to separate the two pistons. Normally the valve 67 allows passage to the liquid under pressure which forces the piston 69 downward, this piston pushes in turn the piston 71 outward through the medium of the spring 76 so that normally the legs to which the wheels are attached are extended to their full lengths. When the aeroplane lands and when the wheel has a tendency to be pushed suddenly upward, the piston 71 is raised expelling through the holes 63 the air situated above the plug 73 and thus gives a slight ascensional motion to the piston 69 against the pressure of the liquid through the medium of the spring 76 and the compressed air. When the piston 71 has covered a certain distance the plug 73 strikes against the rod 70 of piston 69 and carries the latter directly upward without producing a shock as the piston 69 was already moving. From this moment the stroke of the pistons is slackened down more and more because of the incompressibility of the liquid which is slowly forced through the valve 66 having a small section and finally the inertia of the apparatus is absorbed and the pistons slowly perform their opposite movement arriving finally at rest. This system of shock deadeners allows to perform the landing operations quite surely without any risk of deteriorating the apparatus.

The function of the apparatus will be readily understood with the aid of the preceding specification. It will be observed however that owing to the fact that the propellers force the air directly under the carrying planes and that the vertical rudder 23 may be positioned so as to offer a great resistance to the propulsion, the apparatus will be able to rise nearly vertically. Lateral and longitudinal balance is automatically maintained as hereinbefore described. The pilot may evidently control directly all the automatic devices so as to be able to direct his course at will and independently of the automatically stabilizing devices hereinbefore described.

The apparatus may be constructed in the form of a monoplane or comprise more than two superposed carrying planes showing all the same characteristic features. Figs. 10 and 11 show the general aspect of a monoplane. The reference numerals designate therein the same members as the corresponding numerals of the other figures. Detail modifications may besides be made in the various devices described above without departing from the spirit of the invention.

Notwithstanding the detailed description and showing of the servo-motors herein, no claim is made in this application to such, the description being included to complete applicant's invention.

Having now fully described our said invention, what we claim and desire to secure by Letters Patent, is:

1. A flying machine including a body and a supporting plane, said supporting plane comprising a central fixed section, and laterally extending movable sections, means for supporting one of said movable sections to permit it to be folded rearward without disturbing its original outline, the other of said movable sections being laterally collapsible toward the fixed section.

2. A flying machine including a supporting plane comprising a fixed central section and independent movable side sections projecting laterally from each side edge of the central section, a movable connection between one of the side sections and the central section to permit the former to be turned rearward without disturbing its original outline, the other of said side sections including hingedly supported beams and fabric supporting purlins slidably mounted on the beams.

3. A supporting plane for flying machines comprising a central fixed section, rigidly intact bow sections projecting laterally from the forward portion of the side edges of the central section, a hinged connection to permit movement of the bow sections, and sail sections collapsible in a series of folds against the central section and within the plane of the bow sections when the latter are folded.

4. A supporting plane for flying machines comprising a central fixed section, side sections projecting laterally therefrom and constructed to permit their collapse in a series of folds against the side section, and bow sections arranged in advance of the side sections and foldable without change of form into a position to overlie the collapsed side sections.

In testimony whereof we have hereunto set our hands in presence of two witnesses.

JULES RACLOT.
CAMILLE ENDERLIN.

Witnesses:
 DEAN B. MASON,
 JACK H. BAKER.

Copies of this patent may be obtained for five cents each, by addressing the "Commissioner of Patents, Washington, D. C."